(12) United States Patent
Dobrogowski et al.

(10) Patent No.: US 11,156,188 B2
(45) Date of Patent: Oct. 26, 2021

(54) SYSTEM FOR ADAPTING AN INTERNAL COMBUSTION ENGINE TO BE POWERED BY GASEOUS FUEL IN GAS PHASE AND BY GASEOUS FUEL IN LIQUID PHASE

(71) Applicant: AC S.A., Bialystok (PL)

(72) Inventors: Piotr Dobrogowski, Dobrzyniewo (PL); Marcin Trocki, Bialystok (PL); Andrzej Sadowski, Wasilkow (PL); Tomasz Cybulko, Bialystok (PL)

(73) Assignee: AC S.A., Bialystok (PL)

( * ) Notice: Subject to any disclaimer, the term of this patent is extended or adjusted under 35 U.S.C. 154(b) by 159 days.

(21) Appl. No.: 16/634,466

(22) PCT Filed: Jul. 28, 2017

(86) PCT No.: PCT/IB2017/054620
§ 371 (c)(1),
(2) Date: Jan. 27, 2020

(87) PCT Pub. No.: WO2019/021040
PCT Pub. Date: Jan. 31, 2019

(65) Prior Publication Data
US 2021/0088003 A1    Mar. 25, 2021

(51) Int. Cl.
| F02M 21/02 | (2006.01) |
| F02D 41/00 | (2006.01) |
| F02D 41/30 | (2006.01) |
| F02D 41/38 | (2006.01) |

(52) U.S. Cl.
CPC ..... *F02M 21/0245* (2013.01); *F02D 41/0027* (2013.01); *F02D 41/3082* (2013.01); *F02M 21/0212* (2013.01); *F02M 21/0242* (2013.01); *F02M 21/0275* (2013.01); *F02M 21/0287* (2013.01); *F02D 2041/389* (2013.01)

(58) Field of Classification Search
CPC ............ F02M 21/0212; F02M 21/023; F02M 21/0242; F02M 21/0275; F02M 21/0287; F02D 19/066; F02D 19/0647; F02D 41/0027
See application file for complete search history.

(56) References Cited

U.S. PATENT DOCUMENTS

| 5,379,740 | A  | * | 1/1995  | Moore     | F02D 19/0628 |
|           |    |   |         |           | 123/478      |
| 7,853,397 | B2 | * | 12/2010 | Pott      | F02D 19/0694 |
|           |    |   |         |           | 701/103      |
| 8,166,956 | B2 | * | 5/2012  | Ulrey     | F02D 19/0689 |
|           |    |   |         |           | 123/525      |
| 9,494,074 | B2 | * | 11/2016 | Jaasma    | F02M 43/00   |
| 9,506,409 | B2 | * | 11/2016 | Ten Broeke| F02D 19/0647 |
| 9,765,707 | B2 | * | 9/2017  | Krug      | F02M 31/20   |
| 10,161,318| B2 | * | 12/2018 | Stroup    | F02D 19/0692 |
| 10,371,065| B2 | * | 8/2019  | Mumford   | F02D 19/0642 |
| 10,465,643| B2 | * | 11/2019 | Blizard   | F02D 19/0647 |

(Continued)

*Primary Examiner* — Sizo B Vilakazi
*Assistant Examiner* — Anthony L Bacon
(74) *Attorney, Agent, or Firm* — Servilla Whitney LLC

(57) ABSTRACT

System for adapting an internal combustion engine to be powered by gaseous fuel in gas phase and by gaseous fuel, an internal combustion engine arrangement comprising the system and a method for adapting an internal combustion liquid fuel engine to be powered by gaseous fuel in gas phase and gaseous fuel in liquid phase.

28 Claims, 3 Drawing Sheets

(56) References Cited

U.S. PATENT DOCUMENTS

Figure 1:
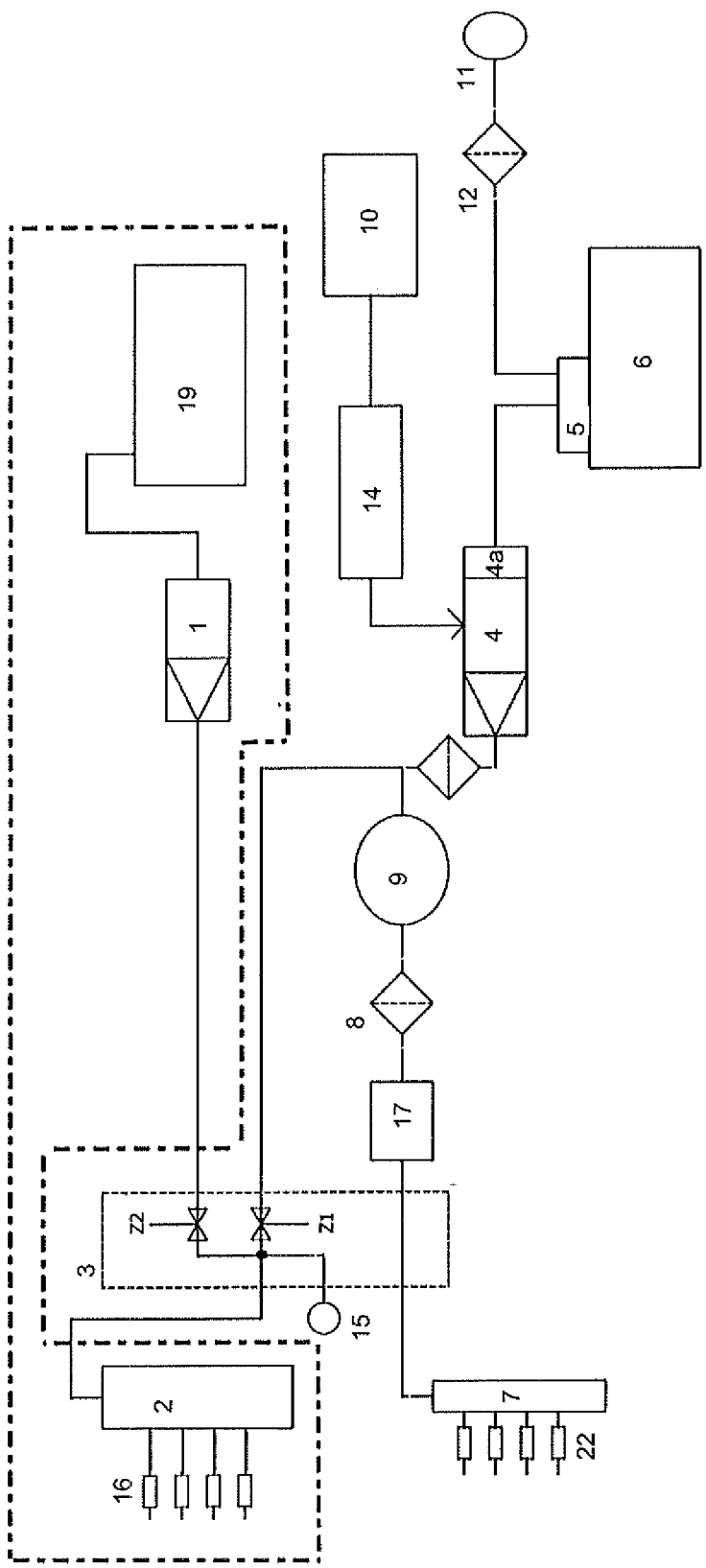

2005/0224601 A1\* 10/2005 Baker ................ F02D 19/0605
    239/132.5
2015/0275813 A1\* 10/2015 Dunn ................ F02D 41/0027
    123/445

\* cited by examiner

SYSTEM FOR ADAPTING AN INTERNAL COMBUSTION ENGINE TO BE POWERED BY GASEOUS FUEL IN GAS PHASE AND BY GASEOUS FUEL IN LIQUID PHASE

CROSS REFERENCE TO RELATED APPLICATIONS

This is a National Phase entry of International Application No. PCT/IB2017/054620, filed Jul. 28, 2017, the disclosure of which is incorporated herein by reference in its entirety.

The invention relates to a system for adapting an internal combustion engine powered by liquid fuel to be powered by gaseous fuel in gas phase and in liquid phase. The invention also relates to a dual fuel internal combustion engine system powered by liquid fuel and, alternatively, simultaneously by gaseous fuel in gas phase and gaseous fuel in liquid phase. The invention also relates to a method for adapting a liquid fuel-based internal combustion engine to be powered by gaseous fuel in liquid phase and simultaneously by gaseous fuel in gas phase.

An internal combustion engine is in particular an engine with direct fuel injection. Liquid fuel is in particular petrol, and gaseous fuel is in particular liquefied liquid gas, hereinafter referred to as LPG (Liquefied Petroleum Gas).

Vehicles equipped with internal combustion engines powered by two types of fuel are increasingly common, as they are environmentally friendly, and the operating costs of such vehicles are lower than operating costs of vehicles powered by heavier fuel types, in particular petrol, diesel and the like.

Most industrially produced vehicles are equipped with an engine arrangement powered by one type of fuel, which is liquid fuel, predominantly petrol or diesel. In order to adapt a single fuel engine to be powered by two fuels, modifications are made to the engine fuel system. In systems known in the art, such modification consists in incorporating in the engine system of a fuel system using another fuel, which is light fuel, for example a gaseous fuel such as LPG, compressed natural gas (also referred to as CNG) etc. Thus, the engine is equipped with two fuel systems. In a dual fuel system, each fuel system comprises its set of injectors, one of which is a set of conventional liquid fuel injectors, and the other is a set of gaseous fuel injectors in gas phase. In a conventional dual fuel engine with direct injection internal combustion, liquid fuel injectors are located in the proximity or vicinity of the combustion chamber located in the engine cylinder, while gaseous fuel injectors in gas phase are on the suction side of the engine cylinder. During conventional operation of the engine using gaseous fuel, the gaseous fuel in gas phase is fed to the engine only by gaseous fuel injectors, while liquid fuel injectors are not used at that point. Conversely, during conventional operation of the engine using liquid fuel, the liquid fuel in gas phase is fed to the engine only by liquid fuel injectors, while gaseous fuel in gas phase injectors are not used at that point.

Such solutions, however, cannot be used in engines with direct injection. In vehicles with direct injection there occurs the problem of overheating of liquid fuel injectors when not in use, that is to say during conventional operation using gaseous fuel. During conventional operation using gaseous fuel the combustion chamber heats up to high temperatures, which in turn also increases the temperature of liquid fuel injectors. Unused liquid fuel injectors liquid heat up, which leads to the accumulation of deposits, occurrence of temperature distortion and, consequently, to their becoming damaged over a very short period of time.

In order to overcome the problems listed above, the system of the invention is provided to adapt a direct injection engine powered by liquid fuel to alternatively power, with gaseous fuel simultaneously in gas phase and liquid phase, a dual fuel engine arrangement of the invention to be powered by liquid fuel or, alternatively, by gaseous fuel simultaneously in gas phase and liquid phase, and a method of the invention for adapting a liquid fuel internal combustion engine to be powered by gaseous fuel simultaneously in gas phase and liquid phase.

The invention relates to a system of the invention for adapting a liquid fuel internal combustion engine to be powered by gaseous fuel in gas phase and by gaseous fuel in liquid phase, the internal combustion engine comprising at least one cylinder and at least one liquid fuel injector for injecting liquid fuel directly into the at least one cylinder, the system comprising:

a tank of gaseous fuel in liquid phase, a pump of gaseous fuel in liquid phase in fluid communication with the tank of gaseous fuel in liquid phase for pumping gaseous fuel in liquid phase from the tank, at least one gaseous fuel injector for injecting gaseous fuel in gas phase, a gaseous fuel reducer for bringing gaseous fuel from liquid phase into gas phase, with the reducer in fluid communication with the gaseous fuel pump for receiving gaseous fuel in liquid phase, and with the at least one gaseous fuel injector for being fed with gaseous fuel in gas phase.

The system of the invention is adapted to be in fluid communication between the pump of gaseous fuel in liquid phase and the at least one liquid fuel injector for supplying by the injector the gaseous fuel in liquid phase and for injecting gaseous fuel in liquid phase directly into the at least one cylinder through the at least one liquid fuel injector.

Preferably, the system further comprises a control system for controlling the system.

Preferably, the control system comprises a controller for controlling the pump of gaseous fuel in liquid state.

Preferably, the control system comprises a gaseous fuel controller for controlling the system.

Preferably, the system comprises a gaseous fuel in liquid phase refuelling valve on a fuel inlet in fluid communication with the tank of gaseous fuel in gas phase, with the gaseous fuel in liquid phase refuelling valve adapted to be in fluid communication with the fuel rail to discharge a part of the gaseous fuel in liquid phase from the fuel rail to the fuel inlet, preferably through a multivalve.

Preferably, the gaseous fuel is LPG.

Dual fuel internal combustion engine arrangement of the invention comprises a liquid fuel tank, a liquid fuel pump in fluid communication with the liquid fuel tank for pumping liquid fuel from the liquid fuel tank when operating in liquid fuel mode, at least one cylinder of internal combustion engine, at least one liquid fuel injector in fluid communication with the liquid fuel pump for injecting liquid fuel directly into the at least one cylinder when operating in liquid fuel mode, tank of gaseous fuel in liquid phase, pump of gaseous fuel in liquid phase in fluid communication with the tank of gaseous fuel in liquid phase for pumping gaseous fuel in liquid phase from the tank of gaseous fuel in liquid phase when operating in gaseous fuel mode, at least one gaseous fuel injector for injecting gaseous fuel in gas phase when operating in gaseous fuel mode, gaseous fuel reducer for bringing gaseous fuel from liquid phase into gas phase when operating in gaseous fuel mode, with the reducer is in fluid communication with the gaseous fuel pump for receiving gaseous fuel in liquid phase, and with the at least one gaseous fuel injector for being fed with gaseous fuel in gas phase when operating in gaseous fuel mode.

The arrangement of the invention is further comprises fluid communication between the pump of gaseous fuel in liquid phase and the at least one liquid fuel injector for supplying by the injector gaseous fuel in liquid phase and for injecting the gaseous fuel in liquid phase directly into the at least one cylinder through the at least one liquid fuel injector when operating in gaseous fuel mode.

Preferably, the system further comprises a control arrangement for controlling the system when operating in liquid fuel and gaseous fuel modes, respectively.

Preferably, the control arrangement comprises a controller for controlling the pump of gaseous fuel in liquid state when operating in gaseous fuel mode.

Preferably, the control system comprises a fuel controller for controlling the system when operating in liquid fuel and gaseous fuel modes, respectively.

Preferably, the fuel rail is adapted to discharge a part of gaseous fuel in liquid state when operating in gaseous fuel mode.

Preferably, the fuel rail is in fluid communication with the tank of gaseous fuel in liquid phase for discharging a part of gaseous fuel in liquid phase from the fuel rail to the tank of gaseous fuel when operating in gaseous fuel mode.

Preferably, the system comprises a gaseous fuel in liquid phase refuelling valve on a fuel inlet in fluid communication with the tank of gaseous fuel in liquid phase, with the fuel rail in fluid communication with the inlet downstream of the refuelling valve of gaseous fuel in liquid phase for discharging a part of gaseous fuel in liquid phase from the fuel rail to the fuel inlet when operating in gaseous fuel mode.

Preferably, the arrangement further comprises a cut-off valve in fluid communication between the at least one liquid fuel injector and the pump of gaseous fuel in gas phase for cutting off the supply of gaseous fuel in liquid phase to the at least one liquid fuel injector when operating in liquid fuel mode, and for enabling the supply of gaseous fuel in liquid phase to the at least one liquid fuel injector when operating in gaseous fuel mode.

Preferably, the system further comprises a cut-off valve in fluid communication with the fuel rail for cutting off the discharge of a part of gaseous fuel in liquid phase of the fuel rail when operating in liquid fuel mode, and for enabling to cut off the discharge of a part of gaseous fuel in liquid phase of the fuel rail when operating in gaseous fuel mode.

Preferably, the system further comprises a cut-off valve in fluid communication between at least one liquid fuel injector and the pump of liquid fuel for cutting off the supply of liquid fuel to the at least one liquid fuel injector when operating in liquid fuel mode, and for enabling the supply of liquid fuel to the at least one liquid fuel injector when operating in liquid fuel mode.

Preferably, the gaseous fuel is LPG.

Preferably, liquid fuel is selected from petrol, diesel fuel.

The method of the invention for adapting an internal combustion liquid fuel engine to be powered by gaseous fuel in gas phase and in liquid phase, where
a liquid fuel internal combustion engine is provided, comprising
    a liquid fuel tank,
    a liquid fuel pump in fluid communication with the liquid fuel tank for pumping liquid fuel from the liquid fuel tank when operating in liquid fuel mode,
    at least one cylinder of internal combustion engine,
    at least one liquid fuel injector in fluid communication with the liquid fuel pump for injecting liquid fuel directly into the at least one cylinder when operating in liquid fuel mode,
a system is provided for adapting an internal combustion liquid fuel engine to be powered by gaseous fuel in gas phase and in liquid phase when operating in gaseous fuel mode, comprising
    tank of gaseous fuel in liquid phase,
    pump of gaseous fuel in liquid phase in fluid communication with the tank of gaseous fuel in liquid phase for pumping gaseous fuel in liquid phase from the tank of gaseous fuel when operating in gaseous fuel mode,
    at least one gaseous fuel injector for injecting gaseous fuel in gas phase when operating in gaseous fuel mode,
    gaseous fuel reducer for bringing gaseous fuel from liquid phase into gas phase when operating in gaseous fuel mode, with the reducer being in fluid communication with the gaseous fuel pump for receiving gaseous fuel in liquid phase, and with the at least one gaseous fuel injector for being fed with gaseous fuel in gas phase when operating in gaseous fuel mode,
a fluid communication is provided between the pump of gaseous fuel in liquid phase and the at least one liquid fuel injector for supplying the gaseous fuel in liquid phase to the injector and to injecting gaseous fuel in liquid phase directly into the at least one cylinder through the at least one liquid fuel injector when operating in gaseous fuel mode.

Preferably, a control system is further provided for control when operating in liquid fuel and gaseous fuel modes, respectively.

Preferably, the control system comprises a controller for controlling the pump of gaseous fuel in liquid state when operating in gaseous fuel mode.

Preferably, the control system comprises a fuel controller for control when operating in liquid fuel and gaseous fuel modes, respectively.

Preferably, it is provided for a part of gaseous fuel in liquid state when operating in gaseous fuel mode to be discharged from the fuel rail.

Preferably, discharging a part of gaseous fuel in liquid phase from the fuel rail when operating in gaseous fuel mode is in a fluid communication of fuel rail with the gaseous fuel tank.

Preferably, for the system comprising a gaseous fuel in liquid phase refuelling valve on a fuel inlet in fluid communication with the tank of gaseous fuel in liquid phase, a fluidic connection is provided between the fuel rail and the inlet downstream of the refuelling valve of the gaseous fuel in liquid phase from the fuel rail to the fuel inlet when operating in gaseous fuel mode.

Preferably, a cut-off valve is further provided in fluid communication between the at least one liquid fuel injector and the pump of gaseous fuel in gas phase for cutting off the supply of gaseous fuel in liquid phase to the at least one liquid fuel injector when operating in liquid fuel mode, and for enabling the supply of gaseous fuel in liquid phase to the at least one liquid fuel injector when operating in gaseous fuel mode.

Preferably, a cut-off valve is further provided in fluid communication with the fuel rail for cutting off the discharge of a part of gaseous fuel in liquid phase from the fuel rail when operating in liquid fuel mode, and for enabling to cut off the discharge of a part of gaseous fuel in liquid phase from the fuel rail when operating in gaseous fuel mode.

Preferably, a cut-off valve is further provided in fluid communication between at least one liquid fuel injector and the pump of liquid fuel for cutting off the supply of liquid fuel to the at least one liquid fuel injector when operating in liquid fuel mode, and for enabling the supply of liquid fuel to the at least one liquid fuel injector when operating in liquid fuel mode.

Thus, in the system of the invention, when the engine is powered by gaseous fuel through injectors of gaseous fuel in gaseous phase, liquid fuel injectors are cooled by supplying gaseous fuel in liquid state to the liquid fuel injectors. Such a solution protects the original liquid fuel injectors among others against overheating, prevents accumulation of sediment therein, thus eliminating the risk of damage.

The system of the invention is simple, and above all it is highly universal, as it requires no modifications to the structure of the liquid fuel pump and it is suitable to be used in virtually all vehicles with direct fuel injection.

The method of the invention enables an engine powered by liquid fuel to be easily and quickly adapted to be powered by gaseous fuel.

The aforementioned vehicles can be passenger cars, trucks, agricultural machines, construction machines and hybrid vehicles.

The system of the invention may be used in any vehicle with direct fuel injection and it is suitable to be used in vehicles with various structures of engine fuel system.

By discharging the excess of the liquid phase of the gaseous fuel in liquid phase from the fuel rail of liquid fuel injectors, the system provides very good cooling of liquid fuel injectors, reducing the risk of damage to the liquid fuel injectors by overheating.

Location of the gaseous fuel pump outside the gaseous fuel tank makes special fuel tanks with built-in pumps unnecessary. As a result, the system is easy to maintain, inspect and repair, if necessary.

The universality of the system is also due to the fact that it may be a part of an industrially manufactured engine arrangement of the invention, having dual fuel supply with liquid fuel and, alternatively, gaseous fuel in gas phase and simultaneously with gaseous fuel in liquid phase. In this case, the production of such an engine system involves adding to the conventional engine system as described above, which requires minor modifications of the engine structure, and, in particular, requires no modifications to be made to the structure of the liquid fuel pump. Thus, the production of the engine arrangement of the invention, having dual fuel supply with liquid fuel and, alternatively, gaseous fuel in gas phase and simultaneously with gaseous fuel in liquid phase is easy, and consequently cheap.

The engine arrangement comprising a system of the invention can generally operate in two alternative modes, namely, the liquid fuel operating mode and the gaseous fuel operating mode.

When operating in the liquid fuel mode, the engine is powered only by liquid fuel, e.g. petrol. In this mode liquid fuel is supplied to the cylinders of the engine to be combusted only by the liquid fuel injectors. When operating in the liquid fuel mode, the gaseous fuel injectors do not operate, i.e. they do not supply any fuel. In this mode gaseous fuel is not supplied to the cylinders for combustion.

When operating in the gaseous fuel mode, the engine is powered only by gaseous fuel. In this mode gaseous fuel is supplied to the cylinders of the engine to be combusted in gas phase by gaseous fuel injectors and simultaneously in liquid phase by liquid fuel injectors. In this mode liquid fuel is not supplied to the cylinders for combustion.

Switching the engine from the liquid fuel operating mode to gaseous fuel operating mode is achieved by the control system. Switching between particular operating modes can be achieved by the command of the user, for example by switching the appropriate operating mode switch. Switching between particular operating modes can be achieved automatically, by a controller after the engine reaches predetermined, for example, engine operation parameters, such as for example engine temperature, gaseous fuel pressure, time elapsed after the start of the engine etc.

The control algorithm located in a liquid fuel controller dedicated to the system determines when and how much of the liquid phase of the liquid fuel and of the gas phase of the liquid fuel is optimal to obtain maximum efficiency of the engine, as the engine system comprising the system can operate supplying gaseous fuel in liquid phase and gaseous fuel in gas phase in any proportions to the engine.

Figure 2:
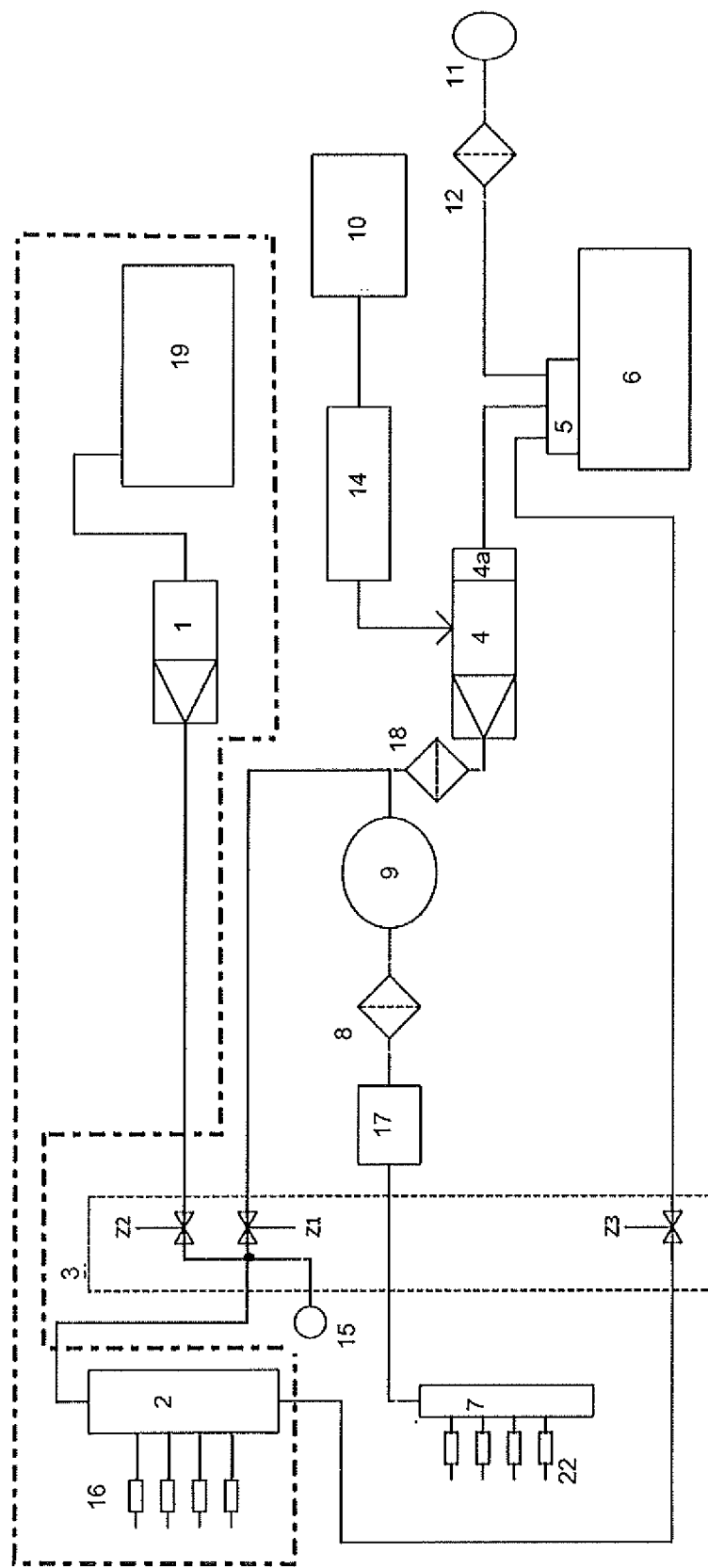
Figure 3:
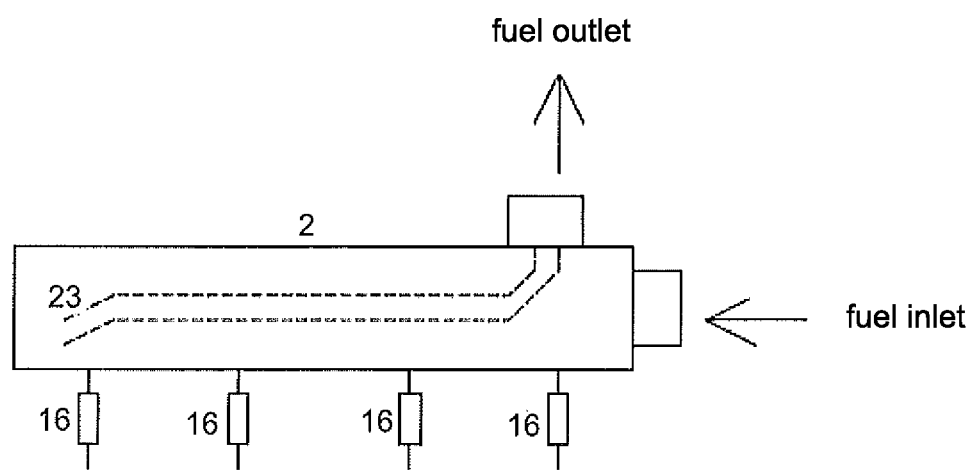

The system of the invention for adapting a liquid fuel internal combustion engine to be powered by gaseous fuel in gas phase and by gaseous fuel in liquid phase, the dual fuel internal combustion engine arrangement of the invention and the method of the invention for adapting a liquid fuel internal combustion engine to be powered by gaseous fuel in gas phase and in liquid phase will now be described in detail in embodiments, with reference to the figures enclosed, in which:

FIG. 1 is the diagram of the internal combustion engine arrangement comprising a system for adapting the internal combustion engine to be powered by petrol and, alternatively, by LPG fuel in the gaseous phase and simultaneously by gaseous fuel gas in liquid phase, FIG. 2 is a diagram of the internal combustion engine arrangement comprising a system for adapting the internal combustion engine to be powered by petrol and, alternatively, by LPG fuel in the gaseous phase and simultaneously by gaseous fuel gas in liquid phase, comprising a return branch from the fuel rail, FIG. 3 is a diagram of the petrol fuel rail of the preferred embodiment.

FIG. 1 schematically shows the arrangement of the invention and its connection to a standard petrol fuel system of an internal combustion engine, with the engine comprising at least one cylinder with direct liquid fuel injection. In a preferred embodiment, the engine comprises one, two, four, eight cylinders. Direct injection of petrol into the combustion chamber of the cylinder is achieved by at least one PB petrol injector 16. Direct fuel injection into the engine cylinder/cylinders is achieved by respectively at least one PB petrol injector 16. In a preferred embodiment, each cylinder is provided with one, two, three or four PB petrol injectors 16. PB petrol injectors 16 form an injector set. Petrol-based engine fuel system, LPG fuel system, and at least one cylinder of the engine form the dual fuel engine system. FIG. 1 and FIG. 2 are a schematic illustration of the components forming a sample engine fuel system, designated by the dotted line.

The petrol-based engine fuel system shown in FIG. 1 and FIG. 2 comprises a pump 1 of PB petrol in fluid communication by means of a fuel line with the tank 19 of PB petrol. PB petrol pump 1 pumps petrol PB from the tank when the engine operates in liquid fuel mode. When operating in liquid fuel mode, the PB petrol pump 1 supplies petrol from the tank 19 by means of a petrol PB fuel line to the fuel rail 2 of petrol PB fuel. In a preferred embodiment, the PB petrol pump 1 is a high pressure pump. The fuel rail 2 of PB petrol supplies PB petrol to at least one injector 16 of PB petrol which injects PB petrol directly into the combustion chamber of the cylinder (not shown) of the internal combustion engine.

The system of the invention is shown in FIG. 1 and FIG. 2, when the system is already connected to the engine PB petrol fuel arrangement. When the system is connected to the fuel arrangement based on PB petrol, the engine arrangement comprises two fuel systems, namely the PB petrol fuel system and LPG fuel system. Thus, the engine can be switched to LPG fuel system or petrol fuel system, respectively. The system of the invention comprises a tank 6 containing LPG fuel in liquid phase. A pump 4 of LPG fuel in liquid phase is in fluid communication by means of a LPG fuel line with the tank 6 for pumping LPG fuel in liquid phase from the tank 6. The system comprises at least one injector 7 of LPG fuel in the gaseous phase for injecting LPG fuel in the gaseous phase into the suction system of the engine cylinder. The system is equipped with a reducer 9 of LPG fuel for bringing LPG fuel from the liquid phase into the gaseous phase, said reducer 9 is in fluid communication by the line of gaseous fuel in liquid phase with the pump 4 of gaseous fuel for receiving LPG fuel in liquid phase. Alternatively, the reducer 9 may be supplied from LPG fuel tank bypassing the pump 4.

The system of the invention is integrated with PB petrol-based engine fuel system so that, between components of the PB petrol-based engine fuel system, and specifically between the outlet of the pump 1 of PB petrol and the inlet of the fuel rail 2, which supplies PB petrol to the PB petrol injectors 16, the supply of LPG fuel in liquid phase is provided by means of a line of LPG fuel in liquid phase. LPG fuel in liquid phase is supplied from the tank 6 by LPG fuel pump 4 to the PB petrol injectors 16. The connection is achieved e.g. by a connection, using a line of LPG fuel in liquid phase, of a supply of LPG in liquid phase to the valve Z1, which is located in LPG fuel engine system on the PB petrol line between the pump 1 of PB petrol and PB petrol injectors 16.

Connecting of the system of the invention with the PB petrol-based engine fuel system is achieved by providing, by means of a line of LPG fuel in liquid phase, a supply of LPG fuel from the pump 4 to at least one injector 16 of LPG fuel in liquid phase, wherein the injector 16 is an component of the PB petrol-based engine fuel arrangement. By ensuring such connection, when operating in the gaseous fuel mode, LPG fuel in liquid phase is continuously supplied to the PB petrol injector 16.

Thus, the PB petrol fuel engine arrangement requires only a small modification in order to adapt it to be connected to the system of the invention using LPG fuel.

In order to adapt an internal combustion PB petrol-based engine to be powered by LPG in the gaseous phase and simultaneously in liquid phase, the system of the invention is mounted in vehicles with a PB petrol powered engine.

The engine system of the invention, after it is connected to an engine system with a PB petrol fuel system, operates as follows. After switching the engine to LPG fuel operating mode, the fuel, due to the pressure present in the tank 6 of LPG fuel, is forced out from the tank 6 through the multi-valve 5 to the pump 4 of LPG fuel, in which the pressure of the pump 4 is increased to the required value. Instead of one pump 4 of LPG fuel an assembly of interconnected pumps of LPG fuel may be used in order to achieve adequate pressure efficiency. Each pump 4 of LPG fuel in liquid phase comprises in its structure a filter 4a of LPG fuel that protects the pump 4 against being contaminated. Said filter 4a is easily removable by unscrewing the screws on the cover of the pump 4 of LPG fuel. The pump 4 or the assembly of pumps 4 are controlled by a controller 10 of LPG fuel via a pump controller 14 based on reading the signal from the pressure sensor 15 located on the fuel rail 2 of PB petrol or in the switching valve block 3. The controller 10 of LPG fuel, depending on the read value of said pressure signal, based on an adequate algorithm, sends a signal to the controller 14 of the pumps. Said controller 14 by means of adequate pulses controls the pump 4 or the assembly of pumps 4 by the voltage value or an adjustable frequency signal.

Then, LPG fuel in liquid phase increased to a suitable pressure (e.g. to about 10 bar or more) is appropriately directed through the fuel line of LPG fuel in liquid phase to the switching valve block 3. The valve Z1 is controlled by a controller 10 of LPG fuel. If the controller switches on the valve Z1, LPG fuel in liquid phase is supplied to the fuel rail 2, and then it is supplied further to the injectors 16 of PB petrol.

FIG. 2 shows a preferred embodiment of the arrangement, which further comprises a return branch for any excess LPG fuel in liquid phase, which branch discharges excess LPG fuel in liquid phase from the fuel rail 2.

When operating in gaseous fuel mode, excess LPG fuel in liquid phase which has not been injected by the injectors flows through the fuel line of LPG fuel in liquid phase back through the return branch in the fuel rail 2 to the switching valve Z3 and then further through the return in the multi-valve 5 of LPG fuel into tank 6 of LPG fuel. The valve Z3 is controlled by a controller 10 of LPG fuel. Providing the return from the fuel rail 2 of PB petrol of unused LPG fuel in liquid phase significantly contributes to lower fuel consumption and cooling efficiency of the injectors 16 of PB petrol. This causes that the injectors 16 of PB petrol are supplied only with the necessary amount of LPG fuel in liquid phase required for cooling the injectors 16 of PB petrol, and the excess amount of LPG fuel in liquid phase is continuously discharged from the fuel rail of PB petrol. Discharging the excess amount of LPG fuel in liquid phase directly contributes to lowering the temperature of the injectors 16 of PB petrol, since the excess amount of LPG fuel in liquid phase is heated in the fuel rail and, if not discharged, it would impair cooling efficiency. Due to the continuous discharge of the excess amount of LPG fuel in liquid phase, which has been heated in the fuel rail 2 and still remains in liquid phase, the temperature of LPG fuel in liquid phase in the fuel rail 2 remains sufficiently low, thus providing very efficient cooling of the injectors 16 of PB petrol. Furthermore, discharging the excess of the gaseous fuel in liquid phase from the fuel rail 2 prevents evaporation of gaseous fuel in liquid phase in the fuel rail 2. The return from the fuel rail 2 to the tank 6 of LPG fuel by the multi-valve 5 of LPG fuel and the switching valve Z3 significantly improves cooling of the injectors 16 of PB petrol when operating in the gaseous fuel mode, as unheated LPG fuel in liquid phase is continuously supplied to the fuel rail 2 of PB petrol. Depending on the vehicle, the effectiveness of temperature reduction amounts to about several degrees Celsius. Supplying LPG fuel in liquid phase at a lower temperature also results in less precipitation of oily substances present in LPG fuel, which, at a higher temperature can deposit in the fuel rail 2 of PB petrol and in the injectors 16 of PB petrol, thus increasing the failure rate of the injectors 16 of petrol.

Additionally, in order to increase the effectiveness of protection of the injectors 16 of PB petrol, the fuel rail 2 can be modified by providing a suction nozzle 23 inside, as shown in FIG. 3. The suction nozzle 23 arranged in the fuel rail 2 may be made of any material. In a preferred embodiment, the suction nozzle is made of plastic. In another preferred embodiment, the suction nozzle is made of a non-corrosive metal, such as for example acid resisting steel. The suction nozzle, as described above, provides that LPG fuel in liquid phase fill the entire space inside the fuel rail 2. Any excess LPG fuel in liquid phase is discharged by the fuel outlet of the fuel rail 2, which in the preferred embodiment is arranged on one of its ends. This ensures a better distribution of LPG fuel in liquid phase across the fuel rail 2 of PB petrol, and thus a more efficient cooling thereof.

The assembly of pumps 4 of LPG fuel in liquid phase can consist of several pumps or one. The pumps used may increase the pressure of the liquid phase of LPG from 5 to 100 bar. The expenditure of the pump unit 4 is controlled by the pump controller 14 designed only to control the pumps 4 and the control of the basic parameters of the pumps. Since the arrangement of the pump 4 is arranged outside the tank 6 of gaseous fuel, the system of supplying the LPG fuel is more flexible and easier to maintain and repair.

In one embodiment, the block 3 of switching valves comprises switching valves Z1, Z2, Z3. In another embodiment, each of the switching valves Z1, Z2, Z3 can be independent and be arranged in its own block 3 of the valve. Moreover, in the system shown, valves Z1 and Z2, which are controlled separately, may be replaced with a three-way valve without electrical control. Due to use the three-way valve, the system has simpler construction, since the system does not need to provide outputting signal from the controller. In this case structure of the controller is simplified and also control algorithm does not need to control, which electro valve Z1, Z2 is switched on. Additional advantage is a reaction speed of the three-way valve, such the three-way valve detects faster changes in supply of a fuel in the system and switch automatically to a given fuel.

In a preferred embodiment, filters 12 of LPG fuel downstream of the inlet 11 of LPG fuel, a filter 18 of LPG fuel in liquid phase downstream of the pump 4 of LPG fuel, a filter 8 of LPG fuel in gas phase downstream of the reducer 9 of LPG fuel are provided.

The system and arrangement of the invention is also equipped with standard pressure sensors.

When operating in the gaseous fuel mode, LPG fuel in gas phase is supplied using a method known from sequential gas installations. LPG fuel from the tank 6 of LPG fuel in liquid phase is supplied by a multi-valve 5, and then by the pump 4 or an assembly of pumps 4 of LPG fuel to the reducer 9 of LPG fuel. The reducer 9 of LPG fuel in the arrangement of the present invention is a single reducer. In a preferred embodiment of the present invention, the reducer 9 of LPG fuel can comprise a plurality of interconnected reducers in order to achieve greater efficiency in bringing LPG fuel from liquid phase to gas phase.

Then, after evaporation, LPG fuel in gas phase at a pressure of 0.9-1.5 bar, optionally through a filter 8 of LPG fuel in gas phase, and optionally through a pressure sensor 17 of LPG fuel in gas phase is supplied to the fuel rail 7 of LPG fuel in gas phase, which supplies LPG fuel in gas phase to the injectors 22 of LPG fuel in gas phase. The injectors 22 of LPG fuel inject LPG fuel in gas phase directly into the suction manifold to the individual cylinders. The injectors 22 of LPG fuel in gas phase can be any injectors used in gas installations. In a preferred embodiment, the injectors are section injectors with any number of sections. Possibly, the so-called gas rails can be used comprising a suitable number of the injectors 22 of LPG fuel in gas phase. The number of sections or injectors depends on the type of vehicle.

The engine arrangement of the invention can operate at a varying liquid-to-gas-phase replacement of LPG fuel. This allows, if there occurs a failure in one of the fuel systems, an operating fuel system provides sufficient expenditure to ensure proper operation of the vehicle.

The control system comprises a controller 10 of LPG fuel and a controller 14 of the pumps and it is fully independent of the installation present in the vehicle. The controllers interact with each other. The controller 10 of LPG fuel sends information to the controller 14 of the pumps, and the latter accordingly controls the performance of the pump 4 or an assemble of pumps 4 of LPG fuel in liquid phase.

The control system of the engine arrangement of the invention can optionally use an OBD self-diagnostic interface provided on the vehicle, for the current correction injection amount of fuel of LPG in the liquid phase and the gas phase.

The entire engine arrangement of the invention supervises a dedicated control system, as described above. The control system comprises a programme that ensures proper and safe control of all components of the engine arrangement of the invention. In addition to the features described above, the control system reads on an ongoing basis the level of LPG fuel in liquid phase from the float of the multivalve 5, measures the injection times from the injectors 16 of petrol and accordingly selects the proportions of the liquid phase of LPG fuel and of the gaseous phase of LPG fuel, which are simultaneously supplied when operating the engine in mode fuel gas. Another feature is the communication with the control panel through which the user can select the operating mode of the engine, that is to say the LPG fuel operating mode or the PB petrol operating mode.

An embodiment of a dual fuel internal combustion engine powered with PB petrol or alternatively with LPG fuel simultaneously in gas phase and liquid phase is described above. The engine arrangement described above comprises the system of the invention.

The embodiment described above has been described for an engine powered by petrol as liquid fuel and by LPG fuel as gaseous fuel.

A person skilled in the art will appreciate that other liquid fuels may be used, such as diesel/bio-ethanol, rapeseed oil, burning oil, heating oil, kerosene, gaseous fuels other than LPG fuel filled in liquid phase, such as LNG.

A person skilled in the art will appreciate that for particular liquid or gaseous fuel suitable engine components will be used, such as liquid fuel pumps, liquid fuel injectors, gaseous fuel pumps, gaseous fuel reducers etc.

The invention claimed is:

1. A system for adapting an internal combustion engine to be powered by gaseous fuel in gas phase and by gaseous fuel in liquid phase at the same time, comprising at least one cylinder and at least one liquid fuel injector for injecting liquid fuel directly into the at least one cylinder, wherein the system comprises:
   a tank of gaseous fuel in liquid phase,
   a pump of gaseous fuel in liquid phase in fluid communication with the tank of gaseous fuel in liquid phase for pumping gaseous fuel in liquid phase from the tank,
   at least one gaseous fuel injector for injecting gaseous fuel in gas phase,
   a gaseous fuel reducer for bringing gaseous fuel from liquid into gas phase, with the reducer in fluid communication with the gaseous fuel pump for receiving gaseous fuel in liquid phase, and with the at least one gaseous fuel injector for being fed with gaseous fuel in gas phase, the system is adapted to be in fluid communication between the pump of gaseous fuel in liquid phase and the at least one liquid fuel injector for supplying by the injector the gaseous fuel in liquid phase and for injecting gaseous fuel in liquid phase directly into the at least one cylinder through the at least one liquid fuel injector.

2. The system according to claim 1, further comprising a control arrangement for controlling the system.

3. The system according to claim 2, wherein the control arrangement comprises a controller for controlling the pump of gaseous fuel in liquid state.

4. The system according to claim 2, wherein the control arrangement comprises a controller of gaseous fuel for controlling the system.

5. The system according to claim 2, wherein the system comprises a gaseous fuel in liquid phase refuelling valve on a fuel inlet in fluid communication with the tank of gaseous fuel in gas phase, wherein the gaseous fuel in liquid phase refuelling valve is adapted to be in fluid communication with the fuel rail to discharge a part gaseous fuel in liquid phase from the fuel rail to the fuel inlet.

6. The system according to claim 1, wherein the gaseous fuel is selected from LPG, liquefied gas fermentation.

7. A dual fuel combustion engine arrangement comprising:
a liquid fuel tank,
a liquid fuel pump in fluid communication with the liquid fuel tank for pumping liquid fuel from the liquid fuel tank when operating in liquid fuel mode,
at least one cylinder of internal combustion engine,
at least one liquid fuel injector in fluid communication with the liquid fuel pump for injecting liquid fuel directly into the at least one cylinder when operating in liquid fuel mode,
a tank of gaseous fuel in liquid phase,
a pump of gaseous fuel in liquid phase in fluid communication with the tank of gaseous fuel in liquid phase for pumping gaseous fuel in liquid phase from the tank of gaseous fuel in liquid phase when operating in gaseous fuel mode,
at least one gaseous fuel injector for injecting gaseous fuel in gas phase when operating in gaseous fuel mode,
gaseous fuel reducer for bringing gaseous fuel from liquid phase into gas phase when operating in gaseous fuel mode, with the reducer in fluid communication with the gaseous fuel pump for receiving gaseous fuel in liquid phase, and with the at least one gaseous fuel injector for being fed with gaseous fuel in gas phase when operating in gaseous fuel mode,
a fluid communication is provided between the pump of gaseous fuel in liquid phase and the at least one liquid fuel injector for supplying by the injector the gaseous fuel in liquid phase and for injecting the gaseous fuel in liquid phase directly into the at least one cylinder through the at least one liquid fuel injector when operating in gaseous fuel mode.

8. The arrangement according to claim 7, further comprising a control arrangement for controlling the system when operating in liquid fuel and gaseous fuel modes.

9. The arrangement according to claim 8, wherein the control arrangement comprises a controller for controlling a pump of gaseous fuel in liquid state when operating in gaseous fuel mode.

10. The arrangement according to claim 8, wherein the control arrangement comprises a controller of fuel for controlling the system when operating in liquid fuel and gaseous fuel modes, respectively.

11. The arrangement according to claim 7, wherein the fuel rail is adapted to discharge a part of gaseous fuel in liquid state when operating in gaseous fuel mode.

12. The arrangement according to claim 11, wherein the fuel rail is in fluid communication with the tank of gaseous fuel in liquid phase for discharging a part of gaseous fuel in liquid phase from the fuel rail to the tank of gaseous fuel when operating in gaseous fuel mode.

13. The arrangement according to claim 11, wherein the system comprises a gaseous fuel in liquid phase refuelling valve on a fuel inlet in fluid communication with the tank of gaseous fuel in liquid phase, with the fuel rail in fluid communication with the inlet downstream of the refuelling valve of gaseous fuel in liquid phase for discharging a part of gaseous fuel in liquid phase from the fuel rail to the fuel inlet when operating in gaseous fuel mode.

14. The arrangement according to claim 7, further comprising a cut-off valve in fluid communication between the at least one liquid fuel injector and the pump of gaseous fuel in gas phase for cutting off the supply of gaseous fuel in liquid phase to the at least one liquid fuel injector when operating in liquid fuel mode and for enabling the supply of gaseous fuel in liquid phase to the at least one liquid fuel injector when operating in gaseous fuel mode.

15. The arrangement according to claim 7, further comprising a cut-off valve in fluid communication with the fuel rail for cutting off the discharge of a part of gaseous fuel in liquid phase of the fuel rail when operating in liquid fuel mode, and for enabling to cut off the discharge of a part of gaseous fuel in liquid phase of the fuel rail when operating in gaseous fuel mode.

16. The arrangement according to claim 7, further comprising a cut-off valve in fluid communication between at least one liquid fuel injector and the pump of liquid fuel for cutting off the supply of liquid fuel to the at least one liquid fuel injector when operating in liquid fuel mode, and for enabling the supply of liquid fuel to the at least one liquid fuel injector when operating in liquid fuel mode.

17. The arrangement according to claim 1, wherein the gaseous fuel is LPG.

18. The arrangement according to claim 1, wherein the liquid fuel is selected from petrol, diesel fuel.

19. A method for adapting an internal combustion liquid fuel engine to be powered by gaseous fuel in gas phase and gaseous fuel in liquid phase, where
a liquid fuel internal combustion engine is provided, comprising
a liquid fuel tank,
a liquid fuel pump in fluid communication with the liquid fuel tank for pumping liquid fuel from the liquid fuel tank when operating in liquid fuel mode,
at least one cylinder of internal combustion engine,
at least one liquid fuel injector in fluid communication with the liquid fuel pump for injecting liquid fuel directly into the at least one cylinder when operating in liquid fuel mode,
and a system is provided for adapting an internal combustion liquid fuel engine to be powered by gaseous fuel in gas phase and in liquid phase when operating in gaseous fuel mode, comprising
a tank of gaseous fuel in liquid phase,
a pump of gaseous fuel in liquid phase in fluid communication with the tank of gaseous fuel in liquid phase for pumping gaseous fuel in liquid phase from the tank of gaseous fuel when operating in gaseous fuel mode, —at least one gaseous fuel injector for injecting gaseous fuel in gas phase when operating in gaseous fuel mode, gaseous fuel reducer for bringing gaseous fuel from liquid phase into gas phase when operating in gaseous fuel mode, with the reducer being in fluid communication with the gaseous fuel pump for receiving gaseous fuel in liquid phase, and with the at least one gaseous fuel injector for being fed with gaseous fuel in gas phase when operating in gaseous fuel mode, and a fluid communication is provided between the pump of gaseous fuel in liquid phase and the at least one liquid fuel injector for supplying the gaseous fuel in liquid phase by the injector and for injecting gaseous fuel in liquid phase directly into the at least one cylinder through the at least one liquid fuel injector when operating in gaseous fuel mode.

20. The method according to claim 19, wherein a control arrangement is further provided for control when operating in liquid fuel and gaseous fuel modes.

21. The method according to claim 20, wherein the control arrangement comprises a controller for controlling the pump of gaseous fuel in liquid state when operating in gaseous fuel mode.

22. The method according to claim 20, wherein the controller arrangement comprises a fuel controller for control when operating in liquid fuel and gaseous fuel modes, respectively.

23. The method according to claim 19, wherein a part of gaseous fuel in liquid state when operating in gaseous fuel mode to be discharged from the fuel rail.

24. The method according to claim 23, wherein discharging the part of gaseous fuel in liquid phase from the fuel rail when operating in gaseous fuel mode is a connection of fuel rail with the gaseous fuel tank.

25. The method according to claim 19, wherein for the system comprising a gaseous fuel in liquid phase refuelling valve on a fuel inlet in fluid communication with the tank of gaseous fuel in liquid phase, a fluid communication is provided between the fuel rail and the inlet downstream of the refuelling valve of the gaseous fuel in liquid phase from the fuel rail to the fuel in when operating in gaseous fuel mode.

26. The method according to claim 19, wherein a cut-off valve is further provided in fluid communication between the at least one liquid fuel injector and the pump of gaseous fuel in gas phase for cutting off the supply of gaseous fuel in liquid phase to the at least one liquid fuel injector when operating in liquid fuel mode, and for enabling the supply of gaseous fuel in liquid phase to the at least one liquid fuel injector when operating in gaseous fuel mode.

27. The method according to claim 19, wherein a cut-off valve is further provided. in fluid communication with the fuel rail for cutting off the discharge of the part of gaseous fuel in liquid phase from the fuel rail when operating in liquid fuel mode, and for enabling to cut off the discharge of a part of gaseous fuel in liquid phase from the fuel rail when operating in gaseous fuel mode.

28. The method according to claim 25, wherein a cut-off valve is further provided in fluid communication between at least one liquid fuel injector and the pump of liquid fuel for cutting off the supply of liquid fuel to the at least one liquid fuel injector when operating in liquid fuel mode, and for enabling the supply of liquid fuel to the at least one liquid fuel injector when operating in liquid fuel mode.

* * * * *